United States Patent [19]
Suzuki et al.

[11] Patent Number: 5,335,232
[45] Date of Patent: Aug. 2, 1994

[54] DATA EXCHANGE CAPABLE OF MINIMIZING LOSS OF A DATA BLOCK

[75] Inventors: Toshio Suzuki; Chikashi Itoh, both of Tokyo, Japan

[73] Assignee: NEC Corporation, Tokyo, Japan

[21] Appl. No.: 886,944

[22] Filed: May 22, 1992

[30] Foreign Application Priority Data

May 23, 1991 [JP] Japan .................................. 3-149716

[51] Int. Cl.⁵ .......................................... G06F 11/00
[52] U.S. Cl. .................................. 371/20.4; 371/8.2; 371/11.2
[58] Field of Search ........................ 371/20.4, 21.2, 24, 371/27, 8.1, 8.2, 9.1, 10.1–10.3, 11.1–11.3, 47.1

[56] References Cited

U.S. PATENT DOCUMENTS

| 4,800,532 | 1/1989 | Honeck et al. | 365/226 |
| 4,908,839 | 8/1990 | Morimoto et al. | 375/40 |
| 4,930,118 | 5/1990 | Sugihara | 370/16 |
| 5,138,637 | 8/1992 | Fox | 375/118 |
| 5,163,132 | 11/1992 | DuLac et al. | 395/275 |

*Primary Examiner*—Hoa T. Nguyen
*Attorney, Agent, or Firm*—Sughrue, Mion, Zinn, Macpeak & Seas

[57] ABSTRACT

In a data exchange for use in an asynchronous transfer mode communication system, the data exchange has first and second buffers. An input data block is selectively loaded with the first and the second buffers to be read as first and second output data blocks out of the first and the second buffers. When the first buffer is used as an active buffer, the input data block is loaded with only the first buffer. When the first buffer is changed into a stand-by buffer, the input data block is loaded with the first and the second buffers. A test data block is loaded as the input data block with the first and the second buffers. When a selected one of the first and second output data blocks is coincident with the test data block, a selected one of the first and the second buffers is controlled so that the selected one of the first and the second output data blocks is not read out of the selected one of the first and the second buffers until a remaining one of the first and the second output data blocks is coincident with the test data block. After each of the first and the second output data blocks is coincident with the test data block, the input data block is loaded with only second buffer. The first buffer is changed into the stand-by buffer.

5 Claims, 2 Drawing Sheets

DATA EXCHANGE CAPABLE OF MINIMIZING LOSS OF A DATA BLOCK

BACKGROUND OF THE INVENTION

This invention relates to a data exchange for exchanging an input data block into an output data block to carry out transmission of the output cell data block.

It is to be noted throughout the instant specification that a data exchange is for use in an asynchronous transfer mode (ATM) communication system and may therefore be called a cell data exchange for exchanging an input data block into an output data, although this invention may not be restricted to the cell data exchange. The cell data exchange comprises first and second exchanging sections each of which exchanges an input cell data block into an output cell data block. One of the first and the second exchanging sections serves as an active exchanging section. Another one of the first and the second exchanging sections serves as a stand-by exchanging section. It is well known in the art that the first and the second exchanging sections have first and second buffers, respectively. When the first exchanging section is operated as the active exchanging section, the first buffer memorizes a plurality of input cell data blocks as memorized cell data blocks. Each of the memorized cell data blocks is read as the output cell data block out of the first buffer. On the other hand, the second buffer is empty during operation of the first buffer.

A conventional cell data exchange further comprises a receiving section and a transmitting section. The receiving section is operable to receive a received cell data block and to supply the received cell data block as the input cell data block to the active exchanging section, for example, the first exchanging section. The transmitting section is for carrying out transmission of the output cell data block.

It is assumed that the first exchanging section serves as the active exchanging section and the second exchanging section serves as the stand-by exchanging section, as mentioned above. Under the circumstances, let the first exchanging section be often changed to the stand-by exchanging section according to a result of a situation of the first exchanging section under control of a control unit in the following manner. In this event, the receiving section at first stops receiving the received cell data block. In addition, the first exchanging section stops producing the output cell data block. As a result, some memorized cell data blocks are held as residual cell data blocks in the first buffer. The residual cell data blocks are transferred to the second buffer through a transfer path. Therefore, the second buffer has the same contents as the first buffer. After transfer of the memorized cell data blocks is finished from the first buffer to the second buffer, the first exchanging section is finally changed to the stand-by exchanging section and the second exchanging section is concurrently changed to the active exchanging section.

However, it is difficult to quickly change the first exchanging section to the stand-by exchanging section in the conventional cell data exchange because it is necessary to transfer the residual cell data blocks held in the first buffer to the second buffer. In addition, the conventional cell data exchange is disadvantageous in that congestion occurs among the received cell data blocks on a reception path connected to the receiving section because the receiving section stops reception of the received cell data blocks. As a result, some received cell data blocks are lost on the reception path so that loss occurs to the input cell data blocks during transfer of the residual data block from the first exchanging section to the second exchanging section.

SUMMARY OF THE INVENTION

It is an object of this invention to provide a data exchange which is capable of quickly changing an active section to a stand-by section.

It is another object of this invention to provide a data exchange which is capable of minimizing loss of input cell data blocks.

According to this invention, there is provided a data exchange for use in an asynchronous transfer mode communication system for exchanging an input data block into an output data block. The data exchange comprises first exchanging means for exchanging the input data block into a first output data block, second exchanging means for exchanging the input data block into a second output data block, receiving means for receiving a received data block to selectively supply the received data block as the input data block to the first and the second exchanging means, and transmitting means for carrying out transmission of one of the first and the second output data blocks as the output data block. The data exchange further comprises control signal producing means for producing first and second control signals. The receiving means is responsive to the first control signal to supply the input data block to the first exchanging means. The receiving means is also responsive to the second control signal to supply the input data block to the first and the second exchanging means. Test cell supplying means supplies a test data block as the input data block to the first and the second exchanging means in response to the second control signal. Detecting means detects whether or not the first output data block is coincident with the test data block to produce a first detecting signal. The detecting means further detects whether or not the second output data block is coincident with the test data block to produce a second detecting signal. Control means is responsive to the first and the second detecting signals for controlling the receiving means and the transmitting means to connect the receiving means and the transmitting means to the second exchanging means.

DESCRIPTION OF THE PREFERRED EMBODIMENT

Figure 1:
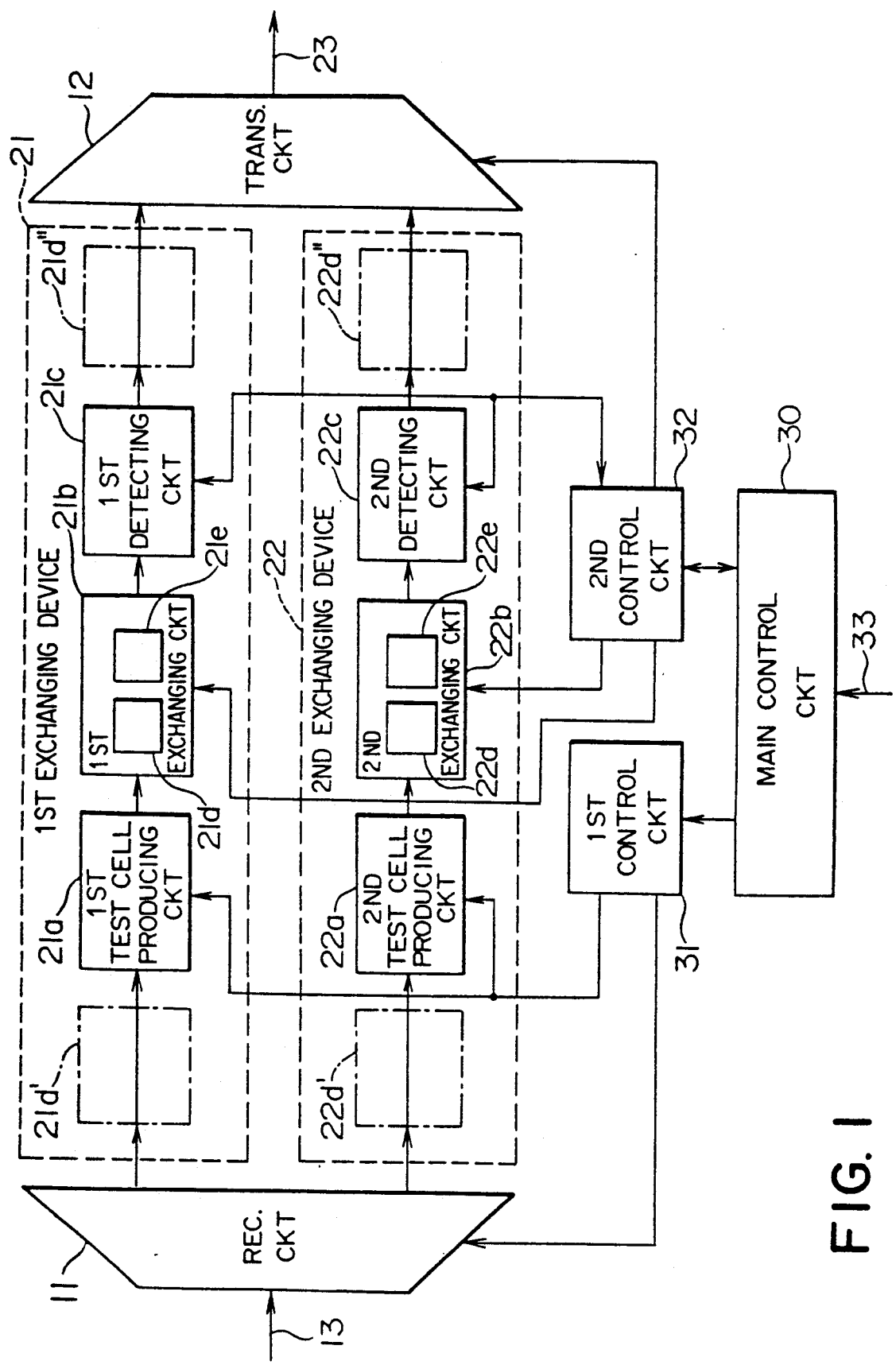
FIG. 1 is a block diagram of a data exchange according to a preferred embodiment of this invention.

Referring to FIG. 1, the illustrated data exchange is for use in an asynchronous transfer mode (ATM) communication system and is operable to exchange an input data block into an output data block. In this connection, each of the input and the output data blocks may be called a cell data block. Each of the input and the output cell data blocks has a data block of a fixed length. The data block has an address area for arranging an address signal and a data area for arranging a data signal. The data exchange exchanges the input data block into the output data block in accordance with the address signal as known in the art.

The data exchange comprises a receiving circuit 11 and a transmitting circuit 12. The receiving circuit 11 is connected to an external receiving path 13 to successively receive a plurality of received cell data blocks. The receiving circuit 11 is further connected to first and second exchanging devices 21 and 22 to selectively supply the received cell data blocks as input cell data blocks to the first and the second exchanging devices 21 and 22. For brevity of description, blocks $21d'$, $22d'$, $21d''$, and $22d''$ depicted at dot-and-dashed lines will be omitted from the first and the second exchanging devices 21 and 22 for the time being. The first exchanging device 21 exchanges each of the input cell data block into a first output cell data block to deliver the first cell data block to the transmitting circuit 12 as will be described hereinafter. Similarly, the second exchanging device 22 exchanges each of the input cell data block into a second output cell data block to deliver the second cell data block to the transmitting circuit 12. The transmitting circuit 12 selectively transmits one of the first and the second cell data blocks as the output cell data block on an external transmission path 23 in a manner to be described later. The data exchange further comprises a main control circuit 30 and first and second control circuits 31 and 32.

The first exchanging device 21 comprises a first test cell producing circuit 21a, a first cell exchanging circuit 21b, and a first detecting circuit 21c. The first cell exchanging circuit 21b comprises a first exchanging unit. 21d and a first buffer 21e. The first exchanging unit 21d exchanges each of the input cell data block into a first exchanged cell data block in a time division fashion to store the first exchanged cell data in the first buffer 21e as a first memorized cell data. Each of the first memorized cell data blocks is read out of the first buffer 21d as the first output cell data block at a predetermined time interval. The first buffer 21e may be, for example, a first-in-first-out memory.

Similarly, the second exchanging device 22 comprises a second test cell producing circuit 22a, a second cell exchanging circuit 22b, and a second detecting circuit 22c. The second cell exchanging circuit 22b comprises a second exchanging unit 22d and a second buffer 22e. Like the first exchanging unit 21d, the second exchanging unit 22d exchanges each of the input cell data block into a second exchanged cell data block in a time division fashion to store the second exchanged cell data in the second buffer 22e as a second memorized cell data. Each of the second memorized cell data blocks is read out of the second buffer 22e as the second output cell data block at the predetermined time interval. The second buffer 22e may be also a first-in-first-out memory.

On an exchange operation, one of the first and the second exchanging devices 21 and 22 is used as an active exchanging device while another one of the first and the second exchanging devices 21 and 22 is used as a stand-by exchanging device. In the illustrated example, it is assumed that the first exchanging device 21 is used as the active exchanging device while the second exchanging device 22 is used as the stand-by exchanging device.

More particularly, the main control circuit 30 supplies an operation mode signal to the first and the second control circuits 31 and 32 in response to an active signal which is given through a control path 33 from an external device (not shown). Thus, the operation mode signal determine either an active state or a stand-by state of the first and the second exchanging devices 21 and 22. The active signal lends itself to set the first exchanging device 21 into the active exchanging device, as will be clear as the description proceeds.

Responsive to the operation mode signal, the first and the second control circuits 31 and 32 supply first reception and transmission control signals to the receiving and the transmitting circuits 11 and 12, respectively. Supplied from the first control circuit 31 with the first reception control signal, the receiving circuit 11 selects the first exchanging device 21 to successively supply the first exchanging device 21 with the received cell data blocks as the input cell data blocks. Responsive to the first transmission control signal, the transmitting circuit 12 selects the first exchanging circuit 22 to receive the first output cell data blocks.

The first reception and the transmission control signals are also delivered to the first and the second test cell producing circuits 21a and 22a and the detecting circuits 21c and 22c, as illustrated in FIG. 1. Supplied with the first reception control signal, the first and the second test cell producing circuits 21a and 22a allow cell data blocks supplied thereto to pass therethrough, respectively. Similarly, the first and the second detecting circuits 21c and 22c allow cell data blocks supplied thereto to pass therethrough in response to the first transmission control signal, respectively. In the illustrated example, the first cell exchanging circuit 21b is intermediate between the first test cell producing circuit 21a and the first detecting circuit 21c to receive the input cell data blocks from the receiving circuit 11 through the test cell producing circuit 21a and to exchange the input cell data blocks into the first output cell data blocks. The first output cell data blocks are delivered through the first detecting circuit 21c to the transmitting circuit 12 to be transmitted as the output cell data blocks on the external transmission path 23.

Reviewing FIG. 1, description will be made as regards a change operation of changing the first exchanging device 21 to the stand-by exchanging device.

On the change operation, the main control circuit 30 is given a ready command signal through the control path 33. Supplied with the ready command signal, the main control circuit 30 controls the first and the second control circuits 31 and 32 so that each of the first and the second control circuits 31 and 32 produces second reception and transmission control signals. The second reception control signal is delivered from the first control circuit 31 to the receiving circuit 11 and the first and the second test cell producing circuits 21a and 22a while the second transmission control signal is delivered from the second control circuit 32 to the first and the second detecting circuits 21c and 22c and the transmitting circuit 12.

Responsive to the second reception control signal, the first and the second test cell producing circuits 21a and 22a produce a pair of test cells to supply the test cell to the first and the second cell exchanging circuits 21b and 22b, respectively. Each test cell has a test cell area for arranging a predetermined pattern signal. After production of the test cells, the receiving circuit 11 supplies both of the first and the second exchanging devices 21 and 22 with the received cell data blocks as the input cell data blocks in response to the second reception control signal.

Figure 2:
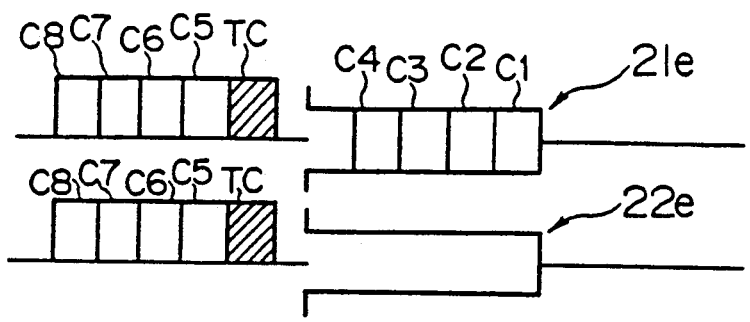
FIG. 2A through 2F are diagram for describing operation of the data exchange illustrated in FIG. 1.
Figure 2:
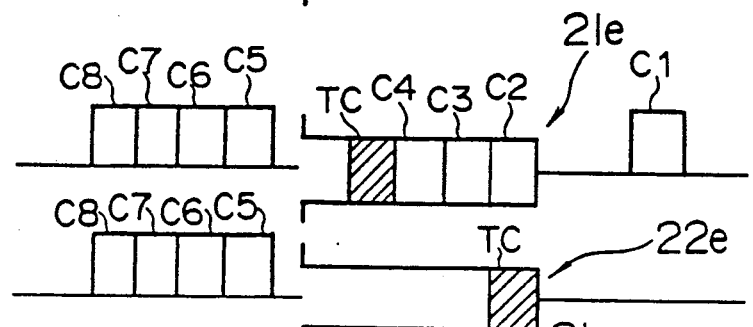
Figure 2:
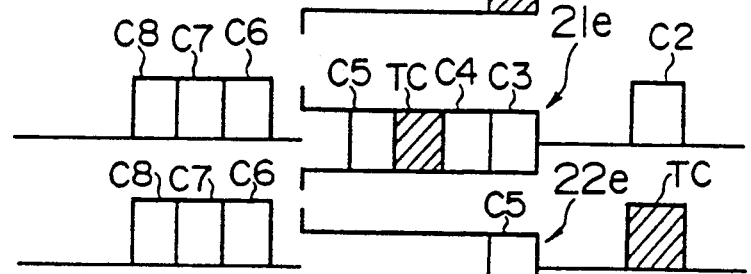
Figure 2:
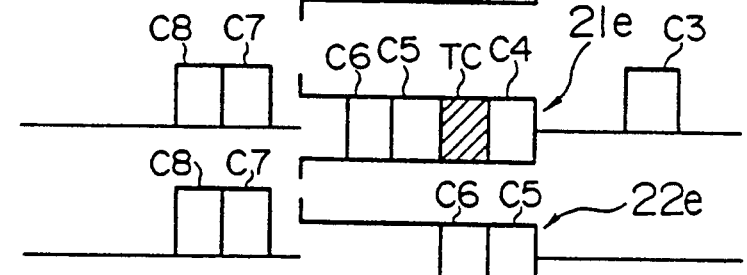
Figure 2:
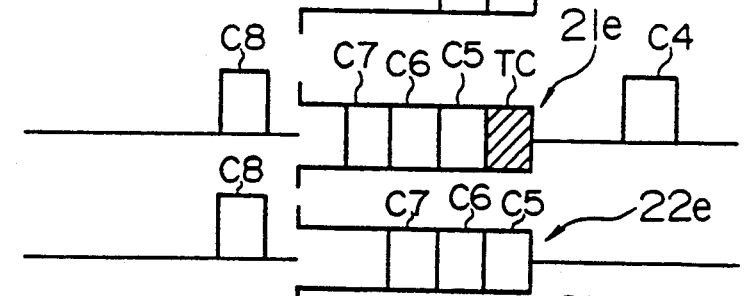
Figure 2:
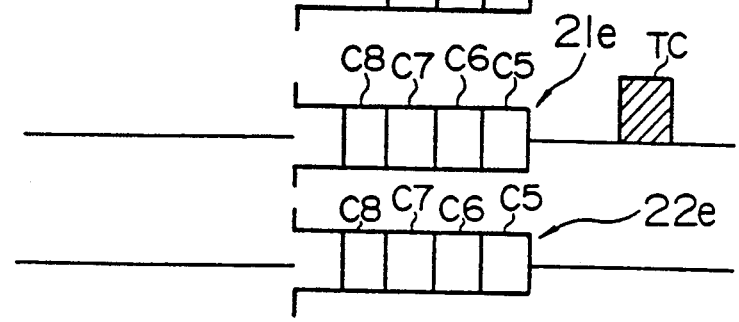

Referring to FIG. 2 in addition to FIG. 1, it is assumed that the first buffer 21e is loaded with memorized cell data blocks C1 to C4 as the first memorized cell data blocks and that the second buffer 22e is empty, as shown in FIG. 2(A). Under the circumstances, the test cell TC is followed by exchanged cell data blocks C5 to C8 which are supplied from each of the first and the second exchanging units 21d and 22d. Namely, the exchanged cell data blocks C5 to C8 are commonly supplied to the first and the second buffers 21e and 22e and both are equal to the first and the second exchanged cell data blocks are identical with each other.

As shown in FIG. 2(B), the test cells TC are memorized in the first and the second buffers 21e and 22e as memorized test cells TC at first time interval, respectively. In this event, the test cell TC is loaded as a memorized test cell with a last stage of the first buffer 21e while the same test cell TC is loaded with a leading stage of the second buffer 22e. The memorized cell data block C1 is read out of the first buffer 21e in a first-in-first-out fashion as the first output cell data blocks to be supplied to the first detecting circuit 21c at the first time interval. On the other hand, no cell data block is read out of the second buffer 22e.

As described above, the first detecting circuit. 21c is given the second transmission control signal during the change operation. Supplied with the second transmission control signal, the first detecting circuit 21c detects whether or not the first output cell data block is coincident with the test cell to produce a first detecting signal representative of a result of detection. More particularly, the first detecting circuit 21c produces the first detecting signal when the first output cell data block has the predetermined pattern signal. In this case, the first detecting circuit 21c does not produce the first detecting signal as the first output cell data block does not have the predetermined pattern signal. The first detecting circuit 21c allows the first output cell data block to pass therethrough.

As shown in FIG. 2(C), the cell data blocks C5 are memorized in the last stage and the leading stage of the first and the second buffers 21e and 22e as memorized cell data blocks C5 at a second time interval, respectively. Simultaneously, the memorized cell data block C2 is read out of the first buffer 21e as the first output cell data blocks to be supplied to the first detecting circuit 21c at the second time interval. In this event, the memorized test cell TC is read out of the second buffer 22e as the second output cell data block to be supplied to the second detecting circuit 22c.

As described above, the second detecting circuit 22c is given the second transmission control signal during the change operation. Supplied with the second transmission control signal, the second detecting circuit 22c detects whether or not the second output cell data block is coincident with the test cell to produce a second detecting signal on detection of coincidence between the second output cell data block and the test cell. More particularly, the second detecting circuit 22c produces the second detecting signal when the second output cell data block has the predetermined pattern signal. On the other hand, the first detecting circuit 21c does not produce the first detecting signal because the first output cell data block does not have the same pattern as the test cell, as illustrated in FIG. 2(C).

The second detecting signal is delivered from the second detecting circuit 21c to the second control circuit 32. Supplied with the second detecting signal, the second control circuit 32 controls the second exchanging circuit 22b to stop a readout operation of the second buffer 22e.

As shown in FIG. 2(D), the cell data blocks C6 are loaded with in the first and the second buffers 21e and 22e as memorized cell data blocks C6 at a third time interval. Instead, the memorized cell data block C3 is read out of the first buffer 21e as the first output cell data blocks to be supplied to the first detecting circuit 21c. On the other hand, no output cell data block is read out of the second buffer 22e because the readout operation is stopped as mentioned before.

As shown in FIG. 2(E), the cell data blocks C7 are loaded with the first and the second buffers 21e and 22e as memorized cell data blocks C7 at a fourth time interval. Simultaneously, the memorized cell data block C4 is read out of the first buffer 21e as the first output cell data block to be supplied to the first detecting circuit 21c at the fourth time interval.

As shown in FIG. 2(F), the cell data blocks C8 are loaded with the first and the second buffers 21e and 22e as memorized cell data blocks C8 at a fifth time interval. The memorized test cell data TC read out of the first buffer 21e as the first output cell data blocks to be supplied to the first detecting circuit 21c at the fifth time interval. As a result, each of the first and the second buffers 21e and 22e is loaded with the memorized cell data blocks C5 to C8. Namely, the second buffer 22e has the same contents as the first buffer 21e.

When the test cell data TC is supplied as the first output cell data block with the first-detecting circuit 21c, the first detecting circuit 21c produces the first detecting signal as described above to supply the first detecting signal to the second control circuit 32. Responsive to the first detecting signal, the second control circuit 32 controls the first exchanging circuit 21b to stop a read operation of the first buffer 21e.

After receiving the first and the second detecting signals, the second control circuit 32 supplies the main control circuit 30 with a change enable signal. Supplied with the change enable signal, the main control circuit 30 delivers a change operation signal to the first and the second control circuits 31 and 32 so as to indicate a change operation. Responsive to the change operation signal, the first control circuit 31 controls the receiving circuit 11 so that the receiving circuit 11 distributes the received cell data blocks only to the second exchanging device 22. On the other hand, the second control circuit 32 controls the transmitting circuit 12 in response to the change operation signal so that the transmitting circuit 12 selects the second output cell data block which is supplied from the second exchanging device 22. Furthermore, the second control circuit 32 makes the first and the second exchanging circuits 21b and 22b allow the readout operation. Stated otherwise, the readout operation of each of the first and the second exchanging circuits 21b and 22b is restarted under control of the second control circuit 32.

In FIG. 1, both of the first and the second test cell producing circuits 21a and 22a may collectively be called a test cell supplying section, as mentioned above. The first and the second detecting circuits 21c and 22c may collectively be referred to as a detecting section for detecting the test cell data. In addition, the main, the first, and the second control circuits 30, 31, and 32 may collectively be called a control signal producing section or a control section for producing the above-mentioned various signals.

Description is made only about changing the first exchanging device into the stand-by exchanging device when the first exchanging device is the active exchanging device in the above embodiment. However, similar operation can be also carried out when the second exchanging device is being operable as the active exchanging device and is thereafter changed into the stand-by exchanging device.

Although the first exchanging circuit 21b is located between the first test cell producing circuit 21a and the first detecting circuit 21c in the above embodiment, only the first buffer 21e may be located between the first test cell producing circuit 21a and the first detecting circuit 21c.

In this case, a first exchanging unit is located either between the receiving circuit 11 and the first test cell producing circuit 21a or between the first detecting circuit 21c and transmitting circuit 12, as indicated by the dot-and-dashed line blocks 21d' and 21d'' in FIG. 1.

Likewise, only the second buffer 22e may be located between the second test cell producing circuit 22a and the second detecting circuit 21c with a second exchanging unit arranged either between the receiving circuit 11 and the second test cell producing circuit 22a or between the second detecting circuit 22c and the transmitting circuit 12, as indicated by the dot-and-dashed line blocks 22d' and 22d'' in FIG. 1.

What is claimed is:

1. A data exchange for use in an asynchronous transfer mode communication system for exchanging an input data block into an output data block, said data exchange comprising first exchanging means for exchanging said input data block into a first output data block, second exchanging means for exchanging said input data block into a second output data block, receiving means for receiving a received data block to selectively supply said received data as said input data block to said first and said second exchanging means, and transmitting means for carrying out transmission of one of said first and said second data blocks as said output data block; wherein said data exchange further comprises:

control signal producing means for producing first and second control signals, said receiving means being responsive to said first control signal to supply said input data block to said first exchanging means, said receiving means being also responsive to said second control signal to supply said input data block to said first and said second exchanging means;

test data supplying means for supplying a test data block as said input data block to said first and said second exchanging means in response to said second control signal;

detecting means for detecting whether or not said first output data block is coincident with said test data block to produce a first detecting signal, said detecting means also detecting whether or not said second output data block is coincident with said test data block to produce a second detecting signal;

control means responsive to said first and said second detecting signals for controlling said receiving means and said transmitting means to connect said receiving means and said transmitting means to said second exchanging means.

2. A data exchange as claimed in claim 1, said received data block comprising a data block which has a predetermined fixed length, an address area for arranging an address signal and a data area for arranging a data signal, said test data block having a test area for arranging a predetermined pattern, wherein said detecting means produces said first and said second detecting signals when said predetermined pattern is detected in said first and said second output data blocks, respectively.

3. A data exchange for use in an asynchronous transfer mode communication system for exchanging an input data block into an output data block, said data exchange comprising first buffer means for memorizing said input data block as a first buffered data block to produce said first buffered data block as a first output data block, second buffer means for memorizing said input data block as a second buffered data block to produce said second buffered data block as a second output data block, receiving means for receiving a received data block to selectively supply said received data as said input data block to said first and said second buffer means, and transmitting means for carrying out transmission of one of said first and said second data blocks as said output data block; wherein said data exchange further comprises:

control signal producing means for producing first and second control signals, said receiving means being responsive to said first control signal to supply said input data block to said first buffer means, said receiving means being responsive to said second control signal to supply said input data block to said first and said second buffer means;

test data supplying means for supplying a test data block as said input data block to said first and said second buffer means in response to said second control signal;

detecting means for detecting whether or not said first output data block is coincident with said test data block to produce a first detecting signal, said detecting means detecting whether or not said second output data block is coincident with said test data block to produce a second detecting signal;

control means responsive to said first and said second detecting signals for controlling said receiving means and said transmitting means to connect said receiving means and said transmitting means to said second buffer means.

4. A data exchange as claimed in claim 3, said received data block comprising a data block format having a predetermined fixed length, an address area for arranging an address signal and a data area for arranging a data signal, said test data block having a test area for arranging a predetermined pattern, wherein said detecting means produces said first and said second detecting signals when said predetermined pattern is detected in said first and said second output data blocks, respectively.

5. A data exchange as claimed in claim 4, wherein a selected one of said first and said second buffer means is controlled so that either one of said first and said second output data blocks is not read out of the selected one of said first and said second buffer means after said predetermined pattern is detected in the selected one of said first and said second buffer means until said predetermined pattern is detected in a remaining one of said first and said second output data blocks that is read out of the remaining one of said first and said second buffer means.

* * * * *